United States Patent Office 3,649,541

Patented Mar. 14, 1972

3,649,541

MAGNETIC RECORDING ELEMENTS CONTAINING STABILIZED CHROMIUM DIOXIDE, A POLYURETHANE BINDER, AND AN ISOCYANATE HARDENING AGENT

Henry Gilbert Ingersoll, Hockessin, Del., assignor to E. I. du Pont de Nemours and Company, Wilmington, Del.

No Drawing. Filed July 10, 1969, Ser. No. 840,845
Int. Cl. H01j *1/26;* G11b *5/70*
U.S. Cl. 252—62.54 11 Claims

ABSTRACT OF THE DISCLOSURE

Magnetic recording compositions contain at least 75% by weight of particulate ferromagnetic chromium oxide, stabilized against reductive degradation, in a binder comprising a non-reactive, preformed polyurethane resin (optionally with other resins) and a polyfunctional isocyanate hardening agent. The compositions are useful for making magnetic recording members, e.g., tapes, discs, cylinders and the like.

CROSS-REFERENCES TO RELATED APPLICATIONS

Assignee's copending application, "Stabilized Ferromagnetic Chromium Dioxide," by Bottjer and Ingersoll, filed May 27, 1968, U.S. Ser. No. 732,109 and its continuation under the same title and with the same applicants, filed May 7, 1969, U.S. Ser. No. 822,683, now U.S. Pat. 3,512,930, describe the preparation of stabilized chromium dioxide useful in the present invention.

The use of stabilized chromium dioxide in other magnetic recording compositions, each with its particular distinguishing feature, is disclosed in the assignee's copending applications of Proskow (CR–6889), filed June 11, 1969, U.S. Ser. No. 832,080, now U.S. Pat. 3,558,492, issued Jan. 26, 1971; Ingersoll (PDC–1145), filed May 8, 1969, U.S. Ser. No. 832,137; and Ingersoll (PDC–1147), filed May 5, 1969, U.S. Ser. No. 821,997.

BACKGROUND OF THE INVENTION

Field of the invention

This invention relates to magnetic recording members, e.g., magnetic tapes, and particularly to magnetic recording members containing a ferromagnetic chromium oxide as the magnetic material and to compositions from which the members or elements are made.

Description of the prior art

It is known that ferromagnetic chromium dioxide is suitable for use as the magnetic medium of magnetic recording members, as mentioned, for example, in Belgian Pat. 666,068; in British Pat. 1,077,843; at page 65 of Pear, "Magnetic Recording in Science and Industry," Reinhold Publishing Corporation, New York, 1967; and at page 157 of Athey, "Magnetic Tape Recording," NASA SP-5038, National Aeronautics and Space Administration, Washington, 1966. The preparation of acicular ferromagnetic chromium dioxide and the making of magnetic recording members from it has been described in a number of patents, among which may be mentioned U.S. Pats. 2,885,365; 2,923,683; 2,923,684; 2,923,685; 2,956,955; 3,080,819; 3,117,093 and 3,278,263. Chromium dioxide prepared as described in these patents has excellent ferromagnetic properties. Magnetic recording members in which such acicular chromium dioxode particles are highly oriented are especially suitable for storage of information.

The formulation of magnetic compositions based on ferromagnetic chromium dioxide has been based largely on the extensive experience gained with compositions based on gamma ferric iron oxide, the most widely accepted magnetic material for magnetic recording members such as tapes. Consequently, most of the chromium dioxide compositions have been restricted to a $CrO_2$ content of 60–75% by weight of the dry magnetic composition (exclusive of any substrate that may be employed), paralleling the practice with $\gamma$-$Fe_2O_3$ as discussed at page 117 of Spratt, "Magnetic Tape Recording," Heywood and Company Limited, London, 1958, and at pages 43–44 of Stewart, "Magnetic Recording Techniques," McGraw-Hill Book Company, Inc., New York, 1958.

The magnetic recording members that contain ferromagnetic chromium dioxide at the accepted prior art levels of 60–75% have excellent properties that are adequate for many applications. However, for some uses, there is a need for improved members with higher magnetic sensitivity and with mechanical properties adjusted to give lower friction and longer wear life. These requirements pertain, for example, in modern high-speed computer applications, and in particular in helical-scan video recording, where the high frequencies involved demand maximum magnetic sensitivity, and where the friction and wear-life requirements are especially severe because of the high relative speed between the moving tape and the rapidly rotating head.

It has long been recognized, for instance in the Spratt reference already mentioned, that a higher level of magnetic oxide in the composition should enhance the magnetic sensitivity and efficiency of the recording member. Attempts to increase oxide content have been limited by the interaction of such variables as the dispersing agent, the binder resin, and the lubricating agent employed. As indicated in the Spratt reference, a point is reached where the binder resin is incapable of binding the magnetic oxide, with the result that the coating either sheds or has a rough surface, both conditions being deleterious to good operating performance. This point is sometimes referred to as the critical pigment volume concentration (CPVC), the point at which there is just enough resin to fill the voids between the pigment particles. This point is expressed mathematically as the volume percent of pigment (magnetic oxide) in the total magnetic composition. For ferromagnetic chromium dioxide, the CPVC is about 42% (by volume) $CrO_2$ in the composition. The prior art compositions that contain 60–75% (by weight) $CrO_2$ do not exceed the CPVC.

Although chromium dioxide in the form of dry powder can be stored at temperatures below 300° C. for many years with no detectable change, it can be chemically reduced and some of its desirable magnetic properties diminished by slow reaction in the presence of water with a number of different types of organic compounds, including some of the most effective dispersing agents. As a result, when chromium dioxide made according to the above-mentioned patents has been used in magnetic recording compositions, it has not been possible to use dispersing agents which would permit achieving high $CrO_2$ levels.

It has now been found that especially desirable and useful magnetic recording compositions can be made from ferromagnetic chromium dioxide that has been treated in such a way as substantially to eliminate its susceptibility to reductive degradation. Such stabilized chromium dioxide can be used with highly effective dispersing agents together with particularly preferred binder resins and lubricants to make magnetic compositions having high concentrations of magnetic oxide. These compositions can be made into magnetic recording members with hitherto unattainable highly favorable magnetic and mechanical performance characteristics.

SUMMARY OF THE INVENTION

This invention relates to a ferromagnetic chromium oxide composition comprising at least 75% by weight of fine, acicular particles of ferromagnetic chromium dioxide stabilized against reductive degradation, said particles being dispersed in a binder comprising a preformed polyurethane resin and a polyfunctional isocyanate hardening agent.

More particularly, the invention relates to a ferromagnetic composition comprising:

(a) 75–86% by weight of fine, acicular particles of ferromagnetic chromium dioxide stabilized against reductive degradation, said particles being dispersed in a binder, (b) said binder comprising, by weight:

(1) 24–85% of at least one preformed polyurethane resin;

(2) 0–60% of at least one other synthetic organic polymeric resin;

(3) 3–30% of at least one polyfunctional isocyanate hardening agent;

(4) 5–25% of at least one dispersing agent; and (5) 0.1–20% of at least one lubricant.

The invention also relates to a process for making the composition by admixing the stabilized ferromagnetic chromium dioxide particles, the dispersing agent(s), and a solvent for the dispersing agent(s), and then admixing the resin(s), hardening agent(s), and lubricant(s).

The invention also relates to a magnetic recording element made from the ferromagnetic chromium oxide composition. The magnetic recording elements of this invention, as compared with prior elements, possess high magnetic sensitivity and efficiency in combination with particularly desirable mechanical properties, such as low coefficients of friction, high resistance to blocking, and long wear life. Although the compositions and members of this invention have oxide contents in excess of the CPVC, they are surprisingly free of the shedding, roughness, and other problems usually associated with high oxide levels. The magnetic compositions and elements of this invention are useful for a variety of magnetic recording applications, e.g., in tapes for audio, video, instrumentation and computer uses, in discs and drums, for control equipment, and as magnetic cores.

DESCRIPTION OF THE PREFERRED EMBODIMENTS

In making magnetic recording members according to this invention, it is essential to use a ferromagnetic chromium oxide that has been treated so as to render it resistant to reductive degradation. As the starting material, any preformed ferromagnetic chromium oxide may be used, but it is desirable to use a form having high coercivity and high remanent magnetization. Particularly desirable is chromium dioxide in single-crystal acicular form possessing magnetocrystalline anistropy with a unique axis of easy magnetization that coincides more or less with the acicular axis. The desirable forms of chromium dioxide have a tetragonal crystal structure of the rutile type, a uniform small particle size, and uniform particle shape. Especially useful are particles with an average length of not more than 10 microns, and a length/width ratio of 2:1 to about 40:1. Particularly preferred are particles with an average length of less than 1.0 micron and a length/width ratio of 10:1 to about 40:1. The preparation of acicular ferromagnetic chromium dioxide is described in U.S. Pats. 2,885,365; 2,923,683; 2,923,684; 2,923,685; 2,956,955; 3,034,988; 3,117,093; and 3,278,263.

For use in the present invention, the ferromagnetic chromium dioxide must be treated to render it insensitive to degradation of its magnetic properties. Essentially, this requires that it must be protected from the action of reducing agents capable of converting $CrO_2$ to the more stable $Cr_2O_3$. While such techniques as coating the surface of the particles with a protective layer, e.g., a resin, may be employed, such a method involves difficulties in selecting a coating material that will not be removed by the solvents, dispersants, lubricants and similar materials used in making up magnetic compositions containing the treated chromium dioxide. The treatment must also be such that the oxide particles are not caused to form aggregates that are difficult to disperse in the composition.

A particularly effective and preferred method for stabilizing the chromium dioxide is the controlled reduction of the surface layer of the particles by treatment with a reducing agent, as described in assignee's copending application of Bottjer and Ingersoll, S.N. 732,109, filed May 27, 1968, and its continuation, S.N. 822,683, filed May 7, 1969, now U.S. Pat. 3,512,930 which illustrate a number of useful organic and inorganic reducing agents. In this method, the reducing agent reacts with the surface of the chromium dioxide to form a protective phase that does not react in the presence of water with organic materials that attack chromium dioxide. Thus, the underlying chromium dioxide is protected from degradation by the moisture and organic materials with which it may come in contact in recording members, but without significant loss of its important magnetic characteristics since it is necessary to convert only a thin surface layer to give the desired protection. The material so treated is characterized by the facts that it does not oxidize benzhydrol and that its X-ray diffraction pattern has a line corresponding to an interplanar spacing of 3.151±0.006 A., both as described fully in the Bottjer and Ingersoll reference.

The preferred ferromagnetic chromium oxide for use in the present invention is, therefore, a ferromagnetic chromium dioxide prepared according to any of the aforementioned patents, i.e., with or without modifying elements in the crystal structure, and after-treated according to the reductive stabilization procedures described by Bottjer and Ingersoll. Optionally, before the reductive stabilization treatment, the chromium dioxide may be heat-treated (upgraded) by the procedure described in assignee's copending application of Bottjer and Cox, S.N. 705,029, filed Feb. 13, 1968, now U.S. Pat. 3,529,930.

The preferred stabilized ferromagnetic chromium oxides have an intrinsic coercive force, $H_{ci}$, of 200 oersteds or greater, preferably more than 400 oersteds; a saturation magnetization, $\sigma_S$, of at least 70 e.m.u./g.; a remanent magnetization, $\sigma_r$, of at least 30 e.m.u./g.; and a remanence ratio, $\sigma_r/\sigma_S$, of at least 0.4. Intrinsic coercive force, $H_{ci}$, is defined in Special Technical Publication No. 85 of the American Society for Testing Materials entitled "Symposium on Magnetic Testing" (1948), pp. 191–198. The values given in the examples hereinafter were determined on a DC ballistic-type apparatus which is a modified form of the apparatus described by Davis and Hartenheim in Review of Scientific Instruments, 7, 147 (1936). Saturation per gram, $\sigma_S$, and remanence per gram, $\sigma_r$, are defined on pp. 5–8 of Bozorth's "Ferromagnetism," D. Van Nostrand Co., New York (1951). The values given hereinafter for these properties were determined in a field of 4,400 oersteds on apparatus similar to that described by T. R. Bardell on pp. 226–228 of "Magnetic Materials in the Electrical Industry," Philosophical Library, New York (1955).

The stabilized ferromagnetic chromium oxides used in the compositions of the examples that follow were made from chromium dioxide prepared as described in Cox U.S. 3,278,263. This initial chromium dioxide product was heated at 335° C. for two hours, then treated with agitation for twenty hours at room temperature in an aqueous slurry having a composition of 100 parts water, ten parts $CrO_2$ and five parts sodium bisulfite ($NaHSO_3$), and finally dried. As taught by the Bottjer and Ingersoll applications already mentioned, the treatment in the sodium bisulfite reducing slurry produced a protective phase on the surface of the $CrO_2$ particles and stabilized them against reductive degradation of their magnetic properties. The treated particles did not oxidize benzhydrol, and their X-ray diffraction patterns exhibited the characteristic line corresponding to an interplanar spacing of 3.151±0.006 A. Unless otherwise noted in the examples, the magnetic properties of the stabilized ferromagnetic oxides used in the examples were $$H_{ic}=460\pm10 \text{ oersteds}, \sigma_s=75.0\pm0.5 \text{ e.m.u./g.},$$
$$\sigma_r=35.2\pm0.3 \text{ e.m.u./g.}, \sigma_r/\sigma_s=0.471\pm0.001$$

The stabilized ferromagnetic chromium dioxide comprises form 75% to about 86% by weight of the magnetic composition of the invention. Recording members made from such compositions, as compared with those having less than 75% $CrO_2$ by weight, are characterized by higher magnetic sensitivity and efficiency, by lower and less erratic frictional properties, and by little or no transverse curvature or "cupping." Erratic frictional properties lead to "stick-slip" travel of a magnetic tape through a tape transport with consequent irregularity and distortion of reproduced signal. Cupping is not uncommon in compositions having oxide/binder ratios below the CPVC because of contraction of the binder as relatively large amounts of solvent are evaporated during drying after coating. It is undesirable because it is directly responsible for difficulty in maintaining good, uniform contact (or spacing) between a tape and the recording and playback heads in use, an obvious requirement for reliable and complete recording and read-out of signal in any tape application. Cupping is minimized, if not eliminated in the recording members of the present invention, in part because of the lesser amount of solvent that must be removed when the binder constitutes a smaller part of the total composition.

The maximum amount of oxide that may be used will depend in part on the adhesive characteristics of the particular binder resin used, on the proportions of resin, dispersant, hardening agent and lubricant in the binder (i.e., non-oxide) portion of the composition, and on the densities of the various components. In general, a useful upper limit is about 86% magnetic oxide. Beyond this point, there is usually insufficient resin present in the composition to bind the magnetic oxide particles together and to anchor the entire composition to a substrate or supporting film, if one is to be used, with the result that the magnetic oxide particles may be easily dislodged to create problems of sloughing and shedding, the coating will be brittle and poorly adhered, and the wear-life and durability in use of the magnetic recording member will be low. It should be noted that magnetic oxide levels as high as 86% $CrO_2$ can be employed only when the oxide is very well dispersed in a tough, resilient, well-lubricated binder. The most effective dispersing agents can be used only when the $CrO_2$ has been stabilized against the degradation of magnetic properties that occurs when these effective dispersants are used with untreated $CrO_2$. The high levels of $CrO_2$, and consequent reduction in the amount of binder resin, also make desirable the inclusion of a hardening agent to assist in binding the magnetic particles in the composition and in anchoring the composition to a substrate, when one is used.

In the magnetic compositions of the invention, the preferred stabilized ferromagnetic chromium oxide is dispersed in a binder comprising an organic polymeric resin together with a dispersing agent and a lubricant. Preferred materials for the organic polymeric resin are the preformed, organo-soluble polyurethane elastomers. Many such materials are commercially available, and their properties and characteristics are well known to those skilled in the art. Of these elastomeric polymers, preferred are polyester-polyurethanes such as are described, for example, in Coffey et al., U.S. 2,606,162; Schollenberger, U.S. 2,871,218; Parker, U.S. 2,888,433; and Harz et al., U.S. 2,978,414. Particularly preferred elastomers are the commercially available, preformed, organo-soluble polyester-polyurethane resins based on diphenylmethane diisocyanate, adipic acid, and an alkanediol having 2–4 carbon atoms, for example, ethylene glycol, propanediol and butanediol, or mixtures of such alkanediols. Also suitable are polyetherpolyurethane elastomers. In the magnetic compositions of this invention, the polyurethane resin comprises 24–85%, preferably 30–85%, by weight of the total binder of the composition, i.e., that portion exclusive of the ferromagnetic chromium oxide and exclusive of any substrate that may be employed.

In one preferred embodiment of the invention, the elastomeric polyurethane is the sole resin component of the magnetic composition. Other embodiments may employ mixtures of the polyurethane elastomer resins with other macromolecular, film-forming, organic polymers, such as epoxides, polyesters, vinyl polymers, polyacrylic and polymethacrylic acids or esters thereof, polybutadiene, polycarbonates, cellulose esters, and mixtures of the polymers or copolymers of two or more of the vinyl or acrylic monomers. These optional additional polymers may comprise up to 60%, and preferably up to 45%, by weight of the total binder portion of the magnetic composition. Particularly preferred materials for use with the elastomeric polyurethanes are the commercially available copolymers of vinylidene chloride with acrylonitrile, incorporated in mixtures having proportions of polyurethane/vinyl copolymer of at least approximately 30/70 and preferably in the range 50/50–70/30.

An essential ingredient of the compositions of this invention is a hardening agent, which contributes to the excellent frictional characteristics and long wear-life of recording members made from these compositions. Particularly useful for this purpose are polyfunctional isocyanates, of which may be mentioned as representative (a) hexamethylene diisocyanate, (b) diphenylmethane diisocyanate, (c) diphenylmethane triisocyanate, (d) toluene diisocyanate, (e) polymethylene polyphenylisocyanate, (f) the $C_{36}$ diisocyanate from linoleic dimer acids, and, as preferred materials, (g) 4,4'-methylene-bis-(cyclohexylisocyanate) and (h) the reaction product of three parts of 2,4-toluene diisocyanate and one part of trimethylol propane. The hardening agent may comprise 3–30% by weight of the binder portion of the magnetic composition, and will preferably be 3–20% by weight. The incorporation of the hardening agent materially improves adhesion when the magnetic composition is coated on a substrate to form, for example, a magnetic tape, with a consequent minimizing of such performance deficiencies as blocking, delamination, tackiness, high friction and the like. The mechanism does not appear to involve cross-linking with the polyurethane elastomer, since this preformed polymer does not contain appropriate reactive sites.

The magnetic compositions of this invention include a dispersing agent to the extent of 5–25% by weight of the total binder portion of the composition. The dispersing agent is essential to good distribution of the ferromagnetic chromium oxide throughout the magnetic composition, and it is on this good distribution that the high level and outstanding uniformity of magnetic sensitivity and efficiency of the recording members of this invention depend in large measure. It is a significant feature of the present invention that the use of stabilized forms of ferromagnetic chromium oxide permits the employment of particularly effective dispersing agents that have an undesirably large reducing action (with consequent loss of magnetic properties) on unstabilized ferromagnetic chromium oxides. Preferred as dispersing agents are the ammonium and sulfonium salts that contain long ($C_{12}$–$C_{22}$) aliphatic chains. Of these, especially effective are internal salts (betaines), such as the lecithins and phosphatides. Also suitable are (a) the organophosphorus compounds described in assignee's copending application of Ingersoll, S.N. 823,137, filed May 8, 1969, (b) the monomeric cyclic amines described in assignee's copending application of Ingersoll, S.N. 821,997, filed May 5, 1969, and (c) the tertiary-amine-containing polymers of Belgian Pat. 719,547. Still other useful compounds are illustrated in the examples hereinafter.

The magnetic compositions of this invention contain lubricants to the extent of 0.1–20% by weight of the total binder portion of the composition. In a given composition, the lubricating adjuvant may be a single material or it may comprise two or more materials added individually or as a mixture. Representative materials are the amides, the alkyl esters, and the metal salts of long-chain fatty acids; the hydrocarbyl silicone oils; saturated and unsaturated long-chain hydrocarbons; fluorocarbon telomers; and the like. Illustrative compounds are butyl stearate, calcium stearate, stearamide, squalane, and others set forth in the examples hereinafter.

The magnetic compositions of this invention may also contain other adjuvants conventionally used in magnetic recording members, such as anti-static agents, anti-fungus agents, and the like.

The invention is illustrated by the examples hereinafter, wherein parts and percentages are given by weight unless otherwise specified, and are discussed in terms of the final dry magnetic composition, i.e., stabilized ferromagnetic chromium oxide, polyurethane resin, any other resin present, hardening agent, dispersing agent, lubricant, plus any other ingredients, but exclusive of any substrate that may be employed. It will be understood, however, that the compositions may initially be made up from solutions of the various components where it is not feasible to use a given component, e.g., the polyurethane resin, in its undissolved form. The solvent content of a given composition is, of course, evaporated in the course of putting the composition into the form of a useful magnetic recording member. The choice of solvent will be governed by the solubility characteristics of the resins, dispersing agents, lubricants and other materials selected for the composition. Representative solvents for the preferred resins and other components of the compositions of this invention are tetrahydrofuran, acetone, cyclohexanone, and methyl ethyl and methyl isobutyl ketones. Mixtures of two or more such solvents can be used.

In preparing magnetic recording compositions according to this invention, the procedures described below may be employed. In a typical procedure, the preformed stabilized ferromagnetic chromium oxide, the dispersing agent and a quantity of solvent are placed in a container together with an amount of Ottawa sand equal to 4–6 times the weight of the chromium oxide, and the ingredients are then slurry-milled. The milling may be accomplished conveniently by the use of one or more stirring discs, e.g., two discs in tandem, rotating at peripheral speeds of 1000–2000 feet per minute. In another suitable procedure for milling, the ingredients in a closed container are shaken on a conventional paint conditioner or shaker, oscillating at about 700–1000 cycles per minute. Conventional ball-milling and pebble-milling may also be used. There is then added a solution of the polymeric resin component(s) in an amount sufficient to give the desired proportion of resin in the final dry composition. After further milling or shaking, the hardening agent, lubricant and any other components are added, and it will frequently be desirable that the additions be made as solutions of these various ingredients. When sufficient final mixing and milling have been carried out, the dispersion may be filtered to remove the sand, deaerated, and adjusted to desired final viscosity by addition of solvent.

The dispersions prepared in this way may be cast by conventional techniques to form self-supporting films which may serve as integral magnetic recording members. Alternatively, they may be coated, e.g., by means of a doctor knife adjusted to give a coating of the desired thickness, on any suitable base material to form supported magnetic recording members. A particularly useful coating technique is the gravure-coating procedure described in assignee's copending application of Long, Ser. No. 540,915, filed Apr. 7, 1966, now U.S. Patent 3,468,700 carried out with apparatus such as that described in Long, U.S. 3,392,701. Among the base materials that may be used are non-magnetic metal sheets, plates, or tapes made from any of a number of organic polymeric materials having suitable characteristics of strength, dimensional stability, surface friction, and the like, all as well understood by those skilled in this art, e.g., films of cellulose acetate or of polyethylene terephthalate. In either case, i.e., supported or non-supported the films or coatings are passed while the coating is still fluid between opposing magnets having an orienting field strength sufficient to align the magnetic particles in parallel fashion. The films or coatings containing the oriented stabilized chromium oxide particles are then allowed to dry at room or elevated temperature for a period of time sufficient to produce hardening of the compositions. The resulting coatings or films may then be aged under various conditions for testing their stability. When they are to be tested for magnetic properties, they may first be calendered at elevated temperature and pressure, the exact temperature and pressure varying with the particular composition of the coating and the base (if any). If the members are to be aged before testing, they will, of course, be stored for the desired length of time in an environment where the desired conditions of temperature and humidity are maintained.

The magnetic recording members of the examples were tested for a number of their more significant magnetic and mechanical performance characteristics according to the following procedures:

Adhesion.—This qualitative test, with results reported on a scale of 0 (very poor) to 100 (excellent), is performed by pressing the coating side of a magnetic tape into contact with a strip 2–3 inches long of 0.5-inch-wide commercially available pressure-sensitive tape, then separating the two tapes by a rapid pull and qualitatively estimating the percent of magnetic coating retained on the magnetic tape.

Blocking.—This test is performed according to Interim Federal Specification W–T–0070 (U.S. Navy, Bureau of Ships), Apr. 26, 1963, Section 4.4.8. In this test, a number of layers of tape are wound around a mandrel, secured in position, and exposed for a given time to specified conditions of temperature and humidity. The values recorded are either (a) the number of inches of tape that must be unwound before further unwinding will proceed unassisted, or (b) the number of revolutions of tape that spontaneously spring away from the mandrel when the restraining force is released.

Coefficient of friction.—This laboratory test is considered to be indicative of the runnability of a magnetic tape in use on tape transport mechanisms. The test is run at 75° F. and 50% relative humidity. The magnetic coating side of a magnetic tape is placed in 180°-arc contact with a stainless steel mandrel having a diameter of 1.5 inches, and a strain-gage apparatus is used to determine the coefficient of friction when the tape is moved over the mandrel at a velocity of 1.8 inches per minute under a load of 234.7 g. per 0.5 inch of tape width. For convenience, this property will be reported in the examples and accompanying tables simply as "Friction," but it is to be understood that the numbers are the dimensionless units of "Coefficient of Friction."

Gross wear.—This test records the rate of degradation of the coating in micro-inches per minute for a loop of magnetic recording tape running against Phosphor bronze shims under conditions adjusted so that a high-quality commercial standard tape wears at a rate of $1.0\mu''$/min.

Output.—Saturation output at a wavelength of 80 microinches is measured on a tape transport having record and reproduce heads like those on the Ampex FR–1400 transport (Ampex Corp., Redwood City, Calif.) at a tape speed of 15 inches per second and a signal frequency of 187.5 kHz. The output in decibels is compared with that of a high-quality commercial iron oxide tape, and the difference (+ or −) is recorded as the output value of the test tape, e.g., a value of +2 signifies that the test tape had 2 db. greater output than the reference standard tape. It must be kept in mind that this is a relative rather than an absolute test. A sample with an output value of −2 db. is thus somewhat less efficient magnetically than the best commercial iron oxide tape used as a standard, but is still substantially superior to ordinary commercial iron oxide tapes, whose output values may be −5 db. to −10 db. as compared with the same standard.

Peak/waist.—The peak-to-waist ratio, *P/W,* is a measurement of the magnetic properties of a magnetic recording member that indicates magnetic loop squareness. In general, high *P/W* values are desirable for magnetic tape. The *P/W* ratio is measured on the first-time derivative of a hysteresis loop curve generated in a field of 1200 oersteds alternating at 60 cycles/second. The derivative curve is available as an oscilloscope display on a standard commercial B/H meter, for example, such a meter as provided by Scientific Atlanta, Model 651B. The *P/W* value is the ratio of the peak amplitude of the derivative curve to the waist amplitude at zero field in the derivative curve.

Stability.—The stability of the magnetic characteristics of a magnetic recording member is determined by measurement of residual intrinsic flux density, $\phi_r$, of a sample of the member when fresh and again after aging. The measurement is made on a DC ballistic-type magnetometer that is a modified form of the apparatus described by Davis and Hartenheim in Review of Scientific Instruments, 7, 147 (1936). Since the rate of degradation of magnetic properties is generally slow at normal room conditions, it is usually desirable to accelerate the test by aging the magnetic recording member at elevated temperature and humidity. Experience has shown that one day of aging at 65° C., 50% RH produces degradation equivalent to that found after about one year of aging under normal storage conditions. The stability data in the examples are all for samples aged at 65° C., 50% RH and are reported as either $D_7$, the percent loss in $\phi_r$ after seven days of aging, or as $t_{10}$, the number of days of aging at which $\Delta\phi_r = -10\%$.

Still frame life.—This test reports the number of hours before clogging of the reproduce head occurs when a magnetic tape is run in still-frame mode on a helical-scan video playback machine (Panasonic NV8100, Matsushita Electric Industrial Co., Ltd.).

Toughness.—This qualitative test for durability of a coating is performed by manually creasing a tape transversely and then rubbing it backward and forward at the crease between the fingers. Results are given in a scale of 0 (very brittle) to 100 (very durable).

The examples that follow are to be considered illustrative of the invention and not limiting.

EXAMPLE I

This example illustrates a magnetic recording member of the invention in the form of a magnetic tape wherein a preferred preformed polyester-polyurethane elastomer is the only resin component of the binder portion of the magnetic member.

To a solution of 0.67 g. soya lecithin in 45 ml. tetrahydrofuran (THF) was added slowly with stirring under nitrogen 24.25 g. of stabilized ferromagnetic chromium dioxide, prepared and stabilized by the procedure defined above and having the magnetic characteristics previously given. To this was added 60 ml. of 20–30 mesh washed Ottawa sand. The dispersion was milled for one hour, using a stirring disc having a diameter of 2.5 inches and running at a peripheral speed of 2000 feet per minute. There was then added (a) 0.051 g. of stearamide/myristamide—75/25 (identified for convenience in the remaining examples as "stearamide"), (b) 0.882 g. dry basis (8.882 g. of a 10% solution in tetrahydrofuran/methyl isobutyl ketone—25/2) of the reaction product of one mole of trimethylol propane with 3 moles of 2,4-toluene diisocyanate, and (c) 4.487 g. dry basis (29.91 g. of a 15% solution in THF) of a commercially available preformed polyurethane resin made from diphenylmethane diisocyanate, adipic acid and butanediol. After an additional 30 minutes of milling, the dispersion thus formed was filtered through a cloth pad supported on a screen having a 2-micron filter rating, and spread by means of a doctor knife, set at a clearance of 0.003 inch, on a 0.001-inch-thick commercial polyethylene terephthalate film base. While the coating thus formed was still fluid, the coated film was passed between opposing magnets having an orienting magnetic field strength of 900 gauss to align the stabilized ferromagnetic chromium dioxide particles in the coating. The oriented layer was dried at room temperature under nitrogen. The dry layer was calendered with two passes between a cotton-filled roll and a polished chrome-plated steel roll having its surface at a temperature of about 105° C. at a pressure of 1000–1200 pounds per linear inch, with the coated side of the film in contact with the polished steel roll.

The composition of the dry magnetic coating, exclusive of the polyethylene terephthalate supporting film was 79.9% by weight chromium dioxide and 20.1% by weight total binder. The composition of the binder portion alone was, by weight:

| | Percent |
|---|---|
| Polyurethane resin | 73.7 |
| 2,4-toluene diisocyanate/trimethylol propane (3/1), hardening agent | 14.5 |
| Soya lecithin dispersant | 11.0 |
| Stearamide lubricant | 0.8 |

The $CrO_2$ content of the composition was 56% by volume, very substantially beyond the CPVC discussed hereinbefore.

The magnetic recording member thus produced had the following characteristics:

Adhesion—100
Blocking—15 revolutions
Coefficient of friction—0.26
Gross wear—0.06μ".
Output—−2.0 db.
*P/W*—42
Stability—$D_7 = -5.1\%$
Toughness—100

EXAMPLES II–IV

Examples II–IV, within the scope of this invention, and Control A, not within the scope of this invention, illustrate varying levels of magnetic oxide in a binder wherein a polyurethane elastomer is the only resin component and wherein two lubricants are used together. The compositions (dry basis, exclusive of substrate) and the performance characteristics of these samples are given in Table 1. The stabilized ferromagnetic chromium dioxide, the polyurethane resin, the polyfunctional isocyanate hardening agent, the soya lecithin dispersant, and the stearamide lubricant were the same as those used in Example I. In addition, each composition contained squalane (2,6,10,15,19,23-hexamethyl tetracosane) as a second lubricant. Examples III and IV were prepared by the procedure of Example I. Control A and Example II each employed a procedure substantially similar but modified in detail such that the soya lecithin dispersant, solvent, $CrO_2$ and sand were milled for 30 minutes using tandem stirring discs each having a diameter of 2.625 inches and running at a peripheral speed of 1250 feet per minute. Also, after addition of resin, hardening agent and lubricant, milling was continued for 60 minutes and the dispersion was then filtered through a 0.5-cm.-thick layer of 180–240 mesh sand on a screen having a 5-micron filter rating. The filtered dispersion was cast at 0.0025-inch wet thickness on 0.001-inch-thick polyethylene terephthalate film base, magnetically oriented as described in Example I, dried at about 85° C. in a chamber, and calendered as described in Example I.

TABLE 1

| | Control A | Example II | Example III | Example IV |
|---|---|---|---|---|
| Composition: | | | | |
| $CrO_2$, percent by weight | 70.0 | 80.0 | 81.3 | 85.7 |
| Binder portion, percent by weight: | | | | |
| (a) Polyurethane resin | 65.0 | 59.8 | 58.0 | 72.0 |
| (b) Hardening agent | 14.9 | 14.7 | 13.3 | 14.5 |
| (c) Soya lecithin dispersant | 11.3 | 16.8 | 11.9 | 11.0 |
| (d) Total lubricant | 8.8 | 8.7 | 16.8 | 2.5 |
| (1) Stearamide | 0.5 | 0.5 | 0.4 | 0.4 |
| (2) Squalane | 8.3 | 8.2 | 16.4 | 2.1 |
| Performance: | | | | |
| Adhesion | 100 | | 100 | 100 |
| Blocking, revolutions | | | 12 | 12 |
| Coefficient of friction | 0.13–0.37 | | 0.35–0.37 | 0.32–0.35 |
| Gross wear, μ''/min | | | 0.0 | 0.0 |
| Output, db | +1.0 | +3.0 | 0.0 | +1.0 |
| Still-frame life, hrs | | >2 | >8 | 2.5 |
| Toughness | 100 | | | 50 |

All of the compositions exhibited good magnetic response, as measured by output at least equivalent to that of a high-quality commercial iron-oxide tape. Example II was outstanding in this regard, perhaps because of unusually good disperson of the oxide by the high level of dispersing agent. Control A, with low $CrO_2$ content outside the range of this invention, had an extremely erratic coefficient of friction, and was also observed to exhibit severe cupping. The remaining samples with higher oxide contents did not display cupping. Example III shows the advantage of high liquid lubricant level for long wear life in video recording. Adhesion in all samples was excellent, illustrating the importance of including the polyfunctional isocyanate hardening agent.

EXAMPLES V–X

These examples illustrate other magnetic recording members of this invention, all with a nominal $CrO_2$ content of 80% by weight of the dry composition, exclusive of substrate, and all containing a polyurethane as the only resin component of the binder portion of the magnetic composition. All compositions were made by the procedures already described and from the materials already identified, with these exceptions:

Example V—The stabilized ferromagnetic chromium dioxide was prepared and treated as already described, but had different magnetic properties, viz, $H_{ic}$=355 oersteds, $\sigma_s$=73.4 e.m.u./g., $\sigma_r$=30.3 e.m.u./g., $\sigma_r/\sigma_s$=0.4128.

Example VII—The polyurethane resin was a high-hardness resin (Estane® 5707, B. F. Goodrich Chemical Company) vs. the high-resilience, low-hardness resin of Example I.

Example VIII—The polyfunctional isocyanate hardening agent was 4,4'-methylene-bis-(cyclohexylisocyanate).

Example V contained only stearamide as lubricant. The remaining compositions contained stearamide in combination with a second lubricant component, viz., squalane in Examples VI and VIII, butyl stearate in Examples VII and IX, and calcium stearate in Example X.

The compositions (exclusive of supporting film) and properties of the magnetic recording members are given in Table 2.

TABLE 2

| | Example V | VI | VII | VIII | IX | X |
|---|---|---|---|---|---|---|
| Composition: | | | | | | |
| $CrO_2$, percent by weight | 80.0 | 79.1 | 80.3 | 80.3 | 80.3 | 80.3 |
| Binder portion, percent by weight: | | | | | | |
| (a) Polyurethane resin | 85.8 | 56.2 | [1] 65.5 | 64.9 | 64.9 | 64.9 |
| (b) Hardening agent | 3.4 | 26.4 | 15.0 | [2] 14.9 | 14.9 | 14.9 |
| (c) Dispersant [3] | 10.0 | 7.7 | 11.0 | 11.4 | 11.4 | 11.4 |
| (d) Total lubricant | 0.8 | 9.7 | 8.5 | 8.8 | 8.8 | 8.8 |
| (1) Stearamide | 0.8 | 0.7 | 0.5 | 0.5 | 0.5 | 0.5 |
| (2) Other | 0 | [4] 9.0 | [5] 8.0 | [4] 8.3 | [5] 8.3 | [6] 8.3 |
| Performance: | | | | | | |
| Adhesion | 100 | | 100 | 100 | 100 | 100 |
| Output, db | | +2.5 | +2.0 | +4.0 | +4.5 | +3.0 |
| Coefficient of friction | 0.27–0.44 | 0.13–0.32 | 0.18–0.26 | 0.18–0.40 | 0.18–0.37 | 0.13 |
| Still-frame life, hrs | 4.25 | >2.0 | >2.0 | 0.85 | >7.0 | >4.0 |
| Toughness | 80 | 30 | 100 | 70 | 60 | |

[1] "Hard" resin as described.
[2] 4,4'-methylene-bis(cyclohexylisocyanate) in Example VIII. 2,4-toluene diisocyanate/trimethylol propane (3/1) in others.
[3] Soya lecithin.
[4] Squalane.
[5] Butyl stearate.
[6] Calcium stearate.

Example V, with only stearamide lubricant, and Examples IX and X, with stearic-acid-derivative lubricants in addition to stearamide, are compositions especially suitable for magnetic tapes for video recording, because of their excellent combination of frictional properties, high output, and long still-frame life. Examples VI–VIII are suitable for other magnetic tape applications, e.g., audio recording, where their high output would be especially useful. Thus, the recording member of Example VII showed high resistance to blocking (13 revolutions), a *P/W* value of 35, and excellent runnability in audio cassettes.

EXAMPLES XI–XIII

Examples XI–XIII and Control B illustrate varying $CrO_2$ levels, given in Table 3, in a binder composition held constant at the following composition by weight:

| | Percent |
|---|---|
| Preformed polyurethane resin from diphenylmethane diisocyanate, adipic acid, and a mixture of alkanediols having 2–4 carbon atoms | 41.2 |
| Vinylidene chloride/acrylonitrile (80/20) copolymer resin | 41.2 |
| Toluene diisocyanate/trimethyl propane (3/1) hardening agent | 6.7 |
| Soya lecithin | 10.2 |
| Stearamide | 0.7 |

These examples also illustrate the combination of the polyurethane binder resin with a preferred second binder resin in 50/50 ratio. The foregoing ingredients and the stabilized ferromagnetic chromium dioxide of Example I were mixed and the resulting compositions made into magnetic recording members, all by the procedures already described. Performance of the members is shown in Table 3.

TABLE 3

| | Control B | Example XI | Example XII | Example XIII |
|---|---|---|---|---|
| Stabilized $CrO_2$, percent by weight | 71.9 | 75.2 | 78.7 | 81.9 |
| Blocking, revolutions | 1 | 15 | 15 | 18 |
| Gross wear, μ″/min | 6 | 1.5 | 1.0 | 1.0 |
| Output, db | −0.9 | +2.1 | +2.1 | +2.1 |

Examples XI–XIII, representative of this invention, show outstandingly better magnetic and mechanical properties than the low-oxide Control B, which is outside the scope of the invention. Stability of Example XI was $t_{10}$=14.5 days; for a similar composition made from unstabilized $CrO_2$, $t_{10}$=~2.0 days.

EXAMPLE XIV

This example shows a 50/50-polyurethane/vinyl copolymer binder composition, made from the same ingredients and by the same procedures as Examples XI–XIII, but incorporating squalane as a second lubricant in addition to stearamide. The composition was as follows:

| | |
|---|---|
| Stabilized $CrO_2$, percent by weight | 78.8 |
| Binder portion, percent by weight: | |
| (a) Polyurethane resin of Example XI | 34.0 |
| (b) Vinyl copolymer of Example XI | 34.0 |
| (c) Hardening agent of Example XI | 13.5 |
| (d) Soya lecthin | 10.4 |
| (e) Total lubricant | 8.1 |
| (1) Stearamide | 0.5 |
| (2) Squalane | 7.6 |

The magnetic recording member made from this composition had an output of −2.0 db, a coefficient of friction of 0.13–0.22, and a still-frame life of ~3.0 hours.

EXAMPLE XV

Example XV compares a composition of this invention with Controls C, D and E, all in a binder made of the polyurethane of Example XI and the vinylidene chloride/acrylonitrile (80/20) copolymer of Example XI in a ratio of 70/30-polyurethane/vinyl copolymer. The hardening agent, dispersing agent and lubricant of Example I were used, and the ingredients were mixed by procedures like those of previous examples. Distinguishing features of the various samples were as follows:

Control C—This composition did not employ a stabilized ferromagnetic chromium dioxide. The chromium dioxide employed was made according to Cox U.S. 3,278,263, but was not subsequently heated or given a reductive stabilization treatment. Its magnetic properties were: $H_{ic}$=455 oersteds, $\sigma_s$=80.5 e.m.u./g., $\sigma_r$=38.3 e.m.u./g., $\sigma_r/\sigma_s$=0.460.

Control D—This composition omitted the polyfunctional isocyanate hardening agent.

Control E—This composition incorporated only a small amount of dispersing agent.

The specific compositions and the performance of magnetic recording members made from them are shown in Table 4.

TABLE 4

| | Example XV | Control C | Control D | Control E |
|---|---|---|---|---|
| Composition: | | | | |
| $CrO_2$, percent by weight | [1] 78 | [2] 79.9 | [1] 77.4 | [1] 78 |
| Binder portion, percent by weight: | | | | |
| (1) Polyurethane resin | 53.30 | 51.13 | 59.13 | 61.37 |
| (2) Vinyl copolymer resin | 22.84 | 22.16 | 26.33 | 26.33 |
| (3) Hardening agent of Ex. I | 9.14 | 10.23 | 0 | 8.0 |
| (4) Soya lecithin | 14.21 | 15.91 | 13.67 | 3.55 |
| (5) Stearamide | 0.51 | 0.57 | 0.87 | 0.75 |
| Performance: | | | | |
| Blocking | [3] 13 | ------- | [4] 4 | [3] 14 |
| Output, db | +0.1 | −4.9 | ------- | −3.9 |
| $P/W$ | 41 | 35 | ------- | 32 |

[1] Stabilized $CrO_2$ of Example I.
[2] Not reductively stabilized.
[3] Rev.
[4] In.

The surprisingly better magnetic properties (output and $P/W$) of Example XV are apparent as compared especially with Control C with non-stabilized oxide and Control E with inadequate dispersing action. Control D was notably poor in resistance to blocking because of the tacky surface resulting from omission of the hardening agent.

EXAMPLES XVI–XVIII

These examples illustrate magnetic compositions of this invention employing various suitable polyurethane resins in admixture with the vinylidene chloride/acrylonitrile (80/20) copolymer resin of Example XI in a 68/32 ratio of polyurethane resin/vinyl copolymer resin. The stabilized ferromagnetic chromium dioxide, the polyfunctional isocyanate hardening agent, the soya lecithin dispersant, and the stearamide lubricant were all the same as in Example I. The polyurethane binder resins were as follows:

Example XVI—A thermoplastic polyurethane elastomer sold by Ruco Division, Hooker Chemical Corporation, under the name "Rucothane P–53," and believed to be a polyether-polyurethane.

Example XVII—A polyether-polyurethane based on polytetramethylene ether glycol and available as Roylar® A850 (Uniroyal, Inc.).

Example XVIII—A polyether-polyurethane commercially available as Estane® 5714 F–1 (B. F. Goodrich Chemical Company).

Procedures like those of Example I were used to prepare the compositions shown in Table 5 and to make the compositions into magnetic recording members, for which performance data are also given in Table 5.

TABLE 5

| | Example XVI | Example XVII | Example XVIII |
|---|---|---|---|
| Composition: | | | |
| Stabilized $CrO_2$, percent by weight | 77.8 | 77.9 | 77.9 |
| Binder portion, percent by weight: | | | |
| (1) Polyurethane resin | [1] 55.1 | [2] 55.1 | [3] 55.1 |
| (2) Vinyl copolymer resin | 25.9 | 25.9 | 25.9 |
| (3) Hardening agent | 8.0 | 8.0 | 8.0 |
| (4) Soya lecithin | 10.2 | 10.2 | 10.2 |
| (5) Stearamide | 0.8 | 0.8 | 0.8 |
| Performance: | | | |
| Blocking, revs | 1 | 18 | 4 |
| Output, db | +2.0 | −1.0 | +2.6 |
| $P/W$ | 53 | ------- | 52 |
| Stability, $D_7$ (percent) | −8.8 | ------- | ------- |
| Toughness | 90 | 70 | 80 |

[1] "Rucothane P–53."
[2] Roylar® A850.
[3] Estane® 5714 F–1.

EXAMPLES XIX–XXI

These examples show the use of polyester resins as second binder resin components in admixture with the preferred preformed polyurethane elastomer resins. The procedures and ingredients of Example I were used, except as noted. The polyester resins employed were:

Examples XIX and XX—A commercially available aromatic-aliphatic polyester (M.W.=~50,000) believed to be the reaction product of ethylene glycol with a mixture of dibasic acids (40/40/10/10-terephthalic/isophthalic/sebacic/adipic).

Example XXI—A linear polyester commercially available as "Vitel PE 200" (Chemical Division, The Goodyear Tire & Rubber Company).

Compositions and properties are given in Table 6, from which it will be seen that magnetic recording members incorporating polyesters as a second binder resin component have outstanding wear resistance, excellent adhesion and toughness, and very god magnetic properties.

TABLE 6

| | Example | | |
|---|---|---|---|
| | XIX | XX | XXI |
| Composition: | | | |
| Stabilized $CrO_2$ of Example I, percent by wt | 78.5 | 78 | 78 |
| Binder portion, percent by weight: | | | |
| (a) Polyurethane resin | [1] 56.7 | [2] 53.3 | [2] 48.1 |
| (b) Polyester resin, as described | 20.9 | 22.9 | 28.0 |
| (c) Hardening agent | [3] 14.5 | [4] 9.1 | [4] 9.0 |
| (d) Soya lecithin | 7.0 | 14.2 | 14.2 |
| (e) Stearamide | 0.9 | 0.5 | 0.7 |
| Performance: | | | |
| Adhesion | 100 | 100 | 100 |
| Blocking, revs | 9 | 1 | 15 |
| Friction | | 0.33 | 0.26 |
| Gross wear, μ''/min | 0.1 | 0.05 | 0.04 |
| Output, db | −4.4 | +3.1 | −0.4 |
| P/W | 38 | 40 | 46 |
| Stability, $t_{10}$, days | 12.1 | | |
| Toughness | 100 | 100 | 100 |

[1] Polyurethane resin of Example I.
[2] Polyurethane resin of Example XI.
[3] Polyfunctional isocyanate of Example VIII.
[4] Polyfunctional isocyanate of Example I.

EXAMPLE XXII

This example illustrates a binder composition in which the soya lecithin dispersing agent of all the preceding examples is replaced by a tertiary-amine-containing polymer. The procedures of Example I were employed. Mechanical properties and magnetic stability were outstanding.

| | |
|---|---|
| Composition: | |
| Stabilized $CrO_2$ of Example V, percent by weight | 78.6 |
| Binder portion, percent by weight: | |
| (a) Polyurethane resin of Example I | 75.7 |
| (b) Polyfunctional isocyanate hardening agent of Example I | 3.4 |
| (c) Methyl acrylate/2-methyl-5-vinylpyridine (85/15) copolymer | 20.0 |
| (d) Stearamide | 0.9 |
| Performance: | |
| Adhesion | 100 |
| Blocking, revs | 10 |
| Friction | 0.37–0.42 |
| Gross Wear, μ''/min | 0.0 |
| Stability, $D_7$ (percent) | −3.9 |
| Still-frame life, hours | 4.7 |
| Toughness | 70 |

EXAMPLES XXIII–XLII

These examples illustrate a number of different dispersing agents in the following composition:

Stalibized ferromagnetic $CrO_2$ of Example I, percent by weight ........ 77.1

Binder portion, percent by weight:

(a) Polyurethane resin of Example I ........ 54.4
(b) Vinyl copolymer resin of Example XI ........ 24.1
(c) Polyfunctional isocyanate hardening agent of Example I ........ 6.7
(d) Dispersing agent (see Table 7) ........ 13.9
(e) Stearamide ........ 0.9

The ratio of binder resins was 70/30-polyurethane/vinyl copolymer. The procedures of Example I were followed. The dispersing agents used and the significant magnetic properties of the resulting magnetic recording members are shown in Table 7. Adhesion and toughness were excellent for all of the compositions.

TABLE 7

| Example | Dispersing agent | Output, db | P/W | Stability, $D_7$ (percent) |
|---|---|---|---|---|
| XXIII | Nonadecylbenzylpyridinium chloride | +1.1 | 38 | [1] |
| XXIV | 2-hexylpyridine | −9.9 | 25 | −7 |
| XXV | 4-tridecylpyridine | −4.9 | 25 | −9 |
| XXVI | 4-nonadecylpyridine | −1.9 | 29 | −8 |
| XXVII | Dodecyl nicotinate | −3.4 | 24 | −6 |
| XXVIII | Octadecyl nicotinate | −3.4 | 23 | −7 |
| XXIX | Dodecylbenzyl trimethyl ammonium hexafluoro phosphate | −1.4 | 23 | −5 |
| XXX | 2-methyl benzothiazole lauryl iodide | −5.4 | 15 | [2] −9 |
| XXXI | 2-methyl benzothiazole hexadecyl bromide | −2.4 | 20 | [2] −6 |
| XXXII | 2,4-dimethyl-4-hydroxymethyl oxazoline hexadecyl bromide | −5.4 | 28 | [2] −8 |
| XXXIII | Dimethyl cocoamine sulfobetaine | −1.9 | 30 | [2] −8 |
| XXXIV | Lauryl picolinium p-toluene sulfonate | −0.9 | 37 | [2] −7 |
| XXXV | Methyl methacrylate/butyl acrylate/2-methyl-5-vinylpyridine (42/42/16) copolymer | −1.4 | 36 | [2] −8 |
| XXXVI | Inositol phosphatide | −1.0 | 40 | −8 |
| XXXVII | N-tallow trimethylene diamine dioleate | −1.0 | 31 | −7.5 |
| XXXVIII | N-tallow trimethylene diamine | −2.0 | 31 | −7.4 |
| XXXIX | Diethyl cyclohexyl ammonium lauryl sulfate | −2.0 | 23 | −6.4 |
| XL | Octylphenoxy-polyethoxy ethanol | −2.4 | 23 | −9.9 |
| XLI | Sodium octyl sulfosuccinate | −1.4 | 32 | −8.0 |
| XLII | Soya lecithin | −2.0 | 38 | −9.0 |

[1] $t_{10}$=>30 days.
[2] Approximate.

EXAMPLES XLIII–XLVI

These examples illustrate various lubricants, used with and without stearamide. The procedures were those of preceding examples. Compositions and properties are given in Table 8.

TABLE 8

| | Example | | | |
|---|---|---|---|---|
| | XLIII | XLIV | XLV | XLVI |
| Composition: | | | | |
| Stabilized $CrO_2$ of Example I, percent by weight | 78.0 | 78.0 | 76.0 | 76.0 |
| Binder portion, percent by weight: | | | | |
| (a) Polyurethane resin | [1] 52.6 | [2] 55.0 | [1] 51.3 | [1] 49.5 |
| (b) Vinyl copolymer resin of Example XI | 24.8 | 26.0 | 22.0 | 30.3 |
| (c) Ratio of (a)/(b) | 68/32 | 68/32 | 70/30 | 62/38 |
| (d) Polyfunctional isocyanate hardening agent of Example I | 8.0 | 8.0 | 8.2 | 8.2 |
| (e) Soya lecithin | 7.1 | 10.2 | 12.7 | 6.4 |
| (f) Total lubricant | 7.5 | 0.8 | 5.8 | 5.6 |
| (1) Stearamide | 0 | 0.8 | 0.6 | 0.6 |
| (2) Other | [3] 7.5 | 0 | [4] 5.2 | [5] 5.0 |
| Performance: | | | | |
| Adhesion | 100 | 99 | 100 | 100 |
| Blocking, revs | | 1 | 3 | 5 |
| Friction | 0.48 | 0.26 | 0.44 | 0.15 |
| Gross wear, $\mu''$/min | | 0.33 | 0 | 1.1 |
| Output, db | −1.5 | −0.5 | +3.1 | −2.4 |
| *P/W* | | 41 | 41 | |
| Stability, $D_7$ (percent) | | −6.8 | | |
| Still-frame life, hrs | >2.5 | | | |
| Toughness | 90 | 100 | 100 | 100 |

[1] Polyurethane resin of Example XI.
[2] Polyurethane resin of Example I.
[3] Squalene.
[4] n-Butyl myristate.
[5] n-Octyl, n-decyl phthalate.

EXAMPLES XLVII–LII

These examples illustrate still other lubricants in conjunction with stearamide, in the following composition:

| | |
|---|---|
| Stabilized $CrO_2$ of Example I, percent by weight | 75.97 |
| Binder portion, percent by weight: | |
| (a) Polyurethane resin of Example XI | 50.9 |
| (b) Vinyl copolymer resin of Example XI | 23.8 |
| (c) Ratio of (a)/(b) | 68/32 |
| (d) Polyfunctional isocyanate hardening agent of Example I | 7.9 |
| (e) Soya lecithin | 9.1 |
| (f) Total lubricant | 8.3 |
| (1) Stearamide | 0.6 |
| (2) Other (see Table 9) | 7.7 |

The procedures employed were those of previous examples. Lubricants are identified and properties of magnetic recording members are given in Table 9. Adhesion and toughness of all samples were good to excellent.

TABLE 9

| Example | Lubricant | Block., rev. | Friction | Gross wear, $\mu''$/min. | Output, db |
|---|---|---|---|---|---|
| XLVII | Diperfluorodecylethyldiphenyl silane | 13 | | 0.07 | −1 |
| XLVIII | Fluoroalkyl ester [1] | 12 | | 0.96 | +1.5 |
| XLIX | Dioctyl sebacate | 12 | 0.18 | | +2.1 |
| L | Molybdenum disulfide | 17 | 0.18 | | −0.9 |
| LI | Polyethylene glycol (M.W.=~300) | | 0.26 | 0.08 | +1.0 |
| LII | Terpene resin S970 (Hercules, Inc.) | | 0.29 | 0.4 | +2 7 |

[1] Zonyl® E-7 (E. I. du Pont de Nemours & Co.), said to be the condensation product of pyromellitic anhydride and a mixture of C-5 and C-7 trihydrofluoroalcohols.

EXAMPLES LIII–LXI

Examples LIII–LX illustrate magnetic recording members especially suitable for video recording and having a very long still-frame life in excess of eight hours because of the incorporation of substantial amounts of the liquid lubricant, squalene. Example XLI, a similar composition but with a lesser amount of squalene, had a still-frame life of 0.25 hour. In addition to long still-frame life, the magnetic recording members as a group displayed other desirable mechanical properties. e.g., blocking=12–18 revs. friction=0.18–0.28, gross wear=0.0–0.26$\mu''$/min. The ingredients were the stabilized ferromagnetic $CrO_2$ of Example I, the polyurethane resin of Example XI, the vinyl copolymer resin of Example XI, the polyfunctional isocyanate hardening agent of Example I, soya lecithin (except in Example LVI, which employed a commercially available oil-free hydroxylated lecithin), stearamide, and squalene. The ratio of polyurethane resin/vinyl copolymer resin was 62/38 in Examples LIII–LVII and 68/32 in Examples LVIII–LXI. Details of the compositions are given in Table 10.

TABLE 10

| | LIII | LIV | LV | LVI | LVII | LVIII | LIX | LX | LXI |
|---|---|---|---|---|---|---|---|---|---|
| Stabilized $CrO_2$ of Example I, percent by weight | 76 | 75.6 | 76.6 | 76 | 76 | 76 | 80 | 83 | 76 |
| Binder portion, percent by weight: | | | | | | | | | |
| (a) Polyurethane resin of Ex. XI | 48.0 | 45.4 | 47.1 | 46.2 | 49.2 | 53.2 | 51.6 | 50.4 | 54.6 |
| (b) Vinyl copolymer resin of Example XI | 29.6 | 28.0 | 29.2 | 28.5 | 30.4 | 25.0 | 24.2 | 23.8 | 26.0 |
| (c) Polyfunctional isocyanate hardening agent of Ex. I | 8.0 | 7.8 | 5.0 | 7.9 | 8.0 | 8.0 | 8.0 | 7.9 | 7.8 |
| (d) Soya lecithin | 6.3 | 8.9 | 6.5 | [1] 9.1 | 6.3 | 6.3 | 8.0 | 9.8 | 9.0 |
| (e) Total lubricant | 8.1 | 9.9 | 12.2 | 8.3 | 6.1 | 7.5 | 8.2 | 8.1 | 2.6 |
| (1) Stearamide | 0.6 | 2.3 | 0.6 | 0.6 | 0.6 | 0 | 0.7 | 0.5 | 0.6 |
| (2) Squalene | 7.5 | 7.6 | 11.6 | 7.7 | 5.5 | 7.5 | 7.5 | 7.6 | 2.0 |
| Still-frame life, hours | >8 | >8 | >8 | >8 | >8 | >8 | >8 | >8 | 0.25 |

[1] Oil-free hydroxylated lecithin.

EXAMPLES LXII–LXVIII

These examples show recording members also suitable for video recording because of long still-frame life, but employing lubricants other than squalane. Other properties for the group were: blocking=13–14 revs., gross wear=0–1.4$\mu''$/min. Procedures were the same as for previous examples. Compositions are given in Table 11.

EXAMPLE LXIX

This example, made by procedures of preceding examples, illustrates a high proportion of second resin in combination with a polyurethane. Magnetic and mechanical properties were excellent.

| | |
|---|---|
| Composition: | |
| Stabilized $CrO_2$ ($Hi_c$=465 oersteds, $\sigma_s$=79.5 e.m.u./g., $\sigma_r$=37.9 e.m.u./g., $\sigma_r/\sigma_s$=0.477), percent by weight | 77.0 |
| Binder portion, percent by weight: | |
| (a) Polyurethane resin of Example XI | 23.52 |
| (b) Vinyl copolymer resin of Example XI | 58.74 |
| (c) Ratio of (a)/(b), approx | 29/71 |
| (d) Polyfunctional isocyanate hardening agent of Example I | 5.02 |
| (e) Soya lecithin | 9.23 |
| (f) Butyl stearate | 3.41 |
| (g) Fungicide (a commercial product believed to be the ferric derivative of 1-hydroxypyridine-2-thione) | 0.08 |
| Performance: | |
| Adhesion | 100 |
| Gross wear, $\mu''$/min | <0.1 |
| Output, db | +4.0 |
| *P/W* | 34 |
| Still-frame life, hours | >2 |

TABLE 11

| | LXII | LXIII | LXIV | LXV | LXVI | LXVII | LXVIII |
|---|---|---|---|---|---|---|---|
| Stabilized $CrO_2$ of Example I, percent by weight | 76 | 76 | 76 | 76 | 76 | 76 | 76 |
| Binder portion, percent by weight: | | | | | | | |
| (a) Polyurethane resin of Example XI | 46.3 | 46.3 | 46.3 | 46.3 | 46.3 | 50.9 | 50.9 |
| (b) Vinyl copolymer resin of Example XI | 28.5 | 28.5 | 28.5 | 28.5 | 28.5 | 23.8 | 23.8 |
| (c) Ratio of (a)/(b) | 62/38 | 62/38 | 62/38 | 62/38 | 62/38 | 68/32 | 68/32 |
| (d) Polyfunctional isocyanate hardenting agent of Ex. I | 7.8 | 7.8 | 7.8 | 7.8 | 7.8 | 7.9 | 7.9 |
| (e) Soya lecithin | 9.1 | 9.1 | 9.1 | 9.1 | 9.1 | 9.1 | 9.1 |
| (f) Total lubricant | 8.3 | 8.3 | 8.3 | 8.3 | 8.3 | 8.3 | 8.3 |
| (1) Stearamide | 0.6 | 0.6 | 2.4 | 0.6 | 3.6 | 0.6 | 0.6 |
| (2) Other | [1] 7.7 | [2] 7.7 | [3] 5.9 | [3] 7.7 | [3] 4.7 | [4] 7.7 | [5] 7.7 |
| Still-frame life, hours | >8 | >8 | >8 | 5.75 | 7.5 | >8 | >8 |

[1] n-Octyl stearate.
[2] n-Butyl stearate.
[3] n-Butyl myristate.
[4] Calcium stearate.
[5] SAE 20 lubricating oil.

EXAMPLES LXX–LXXI

These examples illustrate other useful compositions of this invention, made by the procedures previously described and from ingredients identified in previous examples. The magnetic properties of the stabilized $CrO_2$ were $H_{ic}$=485 oersteds, $\sigma_S$=71.1 e.m.u./g., $\sigma_r$=33.4 e.m.u./g., $\sigma_r/\sigma_S$=0.470.

| | Example | |
|---|---|---|
| | LXX | LXXI |
| Composition: | | |
| Stabilized $CrO_2$, percent by weight | 81.44 | 81.49 |
| Binder portion, percent by weight: | | |
| (a) Polyurethane resin of Example VII | 83.91 | 68.23 |
| (b) Polyfunctional isocyanate hardening agent of Example I | 2.93 | 2.94 |
| (c) Dioleate dispersing agent of Example XXXVII | 4.39 | 4.40 |
| (d) Tertiary amine copolymer of Example XXII | | 15.63 |
| (e) Oleamide | 8.77 | 8.80 |
| Performance: | | |
| Blocking, revs | 2 | 6 |
| Friction | 0.37 | 0.35 |
| Gross wear, $\mu''$/min | 0.04 | 0.06 |
| Output, db | −0.9 | +2.1 |
| *P/W* | 29 | 34 |
| Stability, $t_{10}$, days | 18 | 20 |

EXAMPLE LXXII

This example illustrates another preferred composition, of particular utility for audio and instrumentation tapes because of good response runability and durability. This composition was prepared by procedures like those previously described and a recording member was made by the gravure coating technique hereinbefore mentioned.

Composition

| | |
|---|---|
| Stabilized $CrO_2$, percent by weight | 80 |
| Binder portion, percent by weight: | |
| (a) Polyurethane resin of Example I | 68 |
| (b) Hardening agent of Example I | 15 |
| (c) Soya lecithin | 11 |
| (d) Butyl stearate | 6 |

Performance

| | |
|---|---|
| Blocking rev | >1 |
| Output db | +4 |
| Still-frame life hours | >2 |

EXAMPLE LXXIII

Another preferred composition, especially suitable for video and digital tapes, was also made by previous procedures and coated on a polyethylene terephthalate supporting film by the gravure technique.

Composition

| | |
|---|---|
| Stabilized $CrO_2$, percent by weight | 80 |
| Binder portion, percent by weight: | |
| (a) Polyurethane resin of Example XI | 49 |
| (b) Vinyl copolymer resin of Example XI | 25 |
| (c) Hardening agent of Example I | 8 |
| (d) Soya lecithin | 10 |
| (e) Butyl stearate | 8 |

Performance

| | |
|---|---|
| Adhesion | 100 |
| Output db | +4 |
| *P/W* | 41 |
| Still-frame life hours | 2 |
| Toughness | 100 |

In the foregoing examples, "butyl stearate" is "n-butyl stearate."

The magnetic compositions and members of this invention, as illustrated in the foregoing examples, are characterized by a highly desirable balance of magnetic and mechanical properties that make them suitable for a variety of magnetic recording applications. The use of high proportions of stabilised ferromagnetic chromium dioxide, resistant to reductive degradation and consequent loss of magnetic properties, together with effective disperning agents, leads to high levels of magnetic sensitivity and efficiency that are retained even after long exposure to unfavorable conditions of high temperature and high humidity. The high levels of magnetic oxide are made possible by the use of the preferred elastomeric polyurethane resins in conjunction with the polyfunctional isocyanate hardening agents as the fundamental components of the binder system. The low friction and long wear-life characteristics of the recording members of this invention combined with their good adhesion and toughness recommend them for use in flexible recording media, e.g., magnetic tapes for audio and instrumentation recording, and especially for uses where rigorous wear conditions are encountered as in various computer applications and in helical-scan video recording. Compared with tapes with a conventional content of magnetic oxide in the coating, the high-$CrO_2$ tapes of this invention have low to zero transverse curvature or cupping. Also, because of the high oxide levels, the proportion of the binder portion of the coating is reduced, with consequent economies in manufacture, inasmuch as there is less solvent to be removed. In addition to magnetic tapes, the compositions of the invention are also useful for the manufacture of magnetic drums, discs and the like, where friction and wear-life characteristics may be less important, but where a high and stable level of magnetic properties is very desirable.

The embodiments of the invention in which an exclusive property or privilege is claimed are defined as follows:

1. A ferromagnetic chromium oxide composition comprising at least 75% by weight of fine acicular particles of ferromagnetic chromium dioxide stabilized against reductive degradation, said particles being dispersed in a binder comprising a preformed polyurethane resin and a polyfunctional isocyanate hardening agent.

2. A ferromagnetic chromium oxide composition comprising
- (a) 75%–86% by weight of fine acicular particles of ferromagnetic chromium dioxide, the surface of which particles is stabilized against reductive degradation, said particles being dispersed in an organic polymer binder,
- (b) said binder comprising, by weight,
  - (1) 24%–85% of at least one preformed polyurethane resin;
  - (2) 0–60% of at least one different macromolecular, film-forming organic polymer;
  - (3) 3–30% of at least one polyfunctional isocyanate hardening agent;
  - (4) 5–25% of at least one dispersing agent; and
  - (5) 0.1–20% of at least one lubricant.

3. A composition according to claim 2, wherein said polyurethane resin is a polyester-polyurethane resin of diphenylmethane diisocyanate, adipic acid, and an alkane diol of 2–4 carbon atoms.

4. A composition according to claim 2, where said organic polymer is a vinylidene chloride/acrylonitrile copolymer.

5. A composition according to claim 2, wherein said polyurethane resin is a polyester-polyurethane resin of diphenylmethane diisocyanate, adipic acid, and an alkane diol of 2–4 carbon atoms, and said organic polymer is a vinylidene chloride/acrylonitrile copolymer, said resin and copolymer being present in the proportions 50/50–70/30.

6. A composition according to claim 2, wherein said hardening agent is toluene diisocyanate/trimethylol propane (3/1).

7. A composition according to claim 2, wherein said dispersing agent is soya lecithin.

8. A magnetic recording element comprising a support bearing a layer of ferromagnetic chromium oxide composition comprising at least 75% by weight of fine acicular particles of ferromagnetic chromium dioxide stabilized against reductive degradation, said particles being dispersed in a binder comprising a preformed polyurethane resin and a polyfunctional isocyanate hardening agent.

9. An element according to claim 8 in the form of a tape.

10. A magnetic recording element according to claim 2 bearing a layer of ferromagnetic chromium oxide composition comprising
- (a) 75%–86% by weight of fine acicular particles of ferromagnetic chromium dioxide the surface of which particles is stabilized against reductive degradation, said particles being dispersed in an organic polymer binder,
- (b) said binder comprising, by weight,
  - (1) 24%–85% of at least one preformed polyurethane resin;
  - (2) 0–60% of at least one different macromolecular, film-forming organic polymer;
  - (3) 3–30% of at least one polyfunctional isocyanate hardening agent;
  - (4) 5–25% of at least one dispersing agent; and
  - (5) 0.1–20% of at least one lubricant.

11. An element according to claim 10 in the form of a tape.

References Cited

UNITED STATES PATENTS

| | | | |
|---|---|---|---|
| 3,144,352 | 8/1964 | Talley | 117—138.8 |
| 3,216,846 | 11/1965 | Hendricx | 117—62 |
| 3,357,855 | 12/1967 | Bisschops et al. | 117—138.8 |
| 3,470,020 | 9/1969 | Hendricx et al. | 117—239 |
| 3,507,694 | 4/1970 | Eichler et al. | 117—235 |
| 3,512,930 | 5/1970 | Bottjer et al. | 23—145 |

FOREIGN PATENTS

| | | |
|---|---|---|
| 653,202 | 1/1965 | Belgium. |

OTHER REFERENCES

Diaz., Chem. Abst. 65, Column 884.

Spratt, Magnetic Tape Recording, D. Van Nostrand Co., Inc., New York, N.Y., 1964, p. 127–8.

JAMES E. POER, Primary Examiner

A. P. DEMERS, Assistant Examiner

U.S. Cl. X.R.

117—235; 260—858, 859 R